US012792447B2

(12) United States Patent
Hou et al.

(10) Patent No.: US 12,792,447 B2
(45) Date of Patent: Nov. 10, 2026

(54) ARTIFICIAL INTELLIGENCE-BASED TROUBLESHOOTING FOR AUTOMATED SOFTWARE TESTING

(71) Applicant: Zoom Video Communications, Inc., San Jose, CA (US)

(72) Inventors: Zheng Hou, Hefei (CN); Jian Liao, Hefei (CN); Jie Ma, Hefei (CN); Di Qi, Hefei (CN); Fengchao Sun, Hefei (CN); Gang Wang, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 15 days.

(21) Appl. No.: 18/921,110

(22) Filed: Oct. 21, 2024

(65) Prior Publication Data

US 2026/0111301 A1 Apr. 23, 2026

(51) Int. Cl.

| | |
|---|---|
| ***G06F 11/36*** | (2025.01) |
| ***G06F 11/07*** | (2006.01) |
| ***G06F 11/362*** | (2025.01) |
| ***G06F 11/3668*** | (2025.01) |
| *G06F 11/3604* | (2025.01) |
| *G06F 11/3698* | (2025.01) |
| *G06N 20/00* | (2019.01) |

(52) U.S. Cl.

CPC ............ *G06F 11/079* (2013.01); *G06F 11/36* (2013.01); *G06F 11/362* (2013.01); *G06F 11/3636* (2013.01); *G06F 11/3668* (2013.01); *G06F 11/0766* (2013.01); *G06F 11/3604* (2013.01); *G06F 11/3698* (2025.01); *G06N 20/00* (2019.01)

(58) Field of Classification Search

CPC .. G06F 11/362; G06F 11/3636; G06F 11/079; G06F 11/36; G06F 11/3698; G06N 20/00

See application file for complete search history.

(56) References Cited

U.S. PATENT DOCUMENTS

| | | | | |
|---|---|---|---|---|
| 11,036,622 | B2 * | 6/2021 | Nochilur | G06F 11/3684 |
| 2019/0155572 | A1 * | 5/2019 | Misra | G06F 11/263 |
| 2020/0379887 | A1 * | 12/2020 | Nochilur | G06F 11/3684 |
| 2021/0279577 | A1 * | 9/2021 | West | G06N 3/0475 |
| 2024/0037020 | A1 * | 2/2024 | Hamid | G06N 20/00 |
| 2024/0193077 | A1 | 6/2024 | Alford et al. | |
| 2024/0338306 | A1 * | 10/2024 | Waxman | G06F 9/54 |
| 2025/0004928 | A1 * | 1/2025 | Baker | G06F 11/368 |
| 2025/0005162 | A1 * | 1/2025 | Baker | G06F 11/3684 |

(Continued)

OTHER PUBLICATIONS

International Search Report and Written Opinion for PCT/US2025/046528 mailed Jan. 15, 2026.

*Primary Examiner* — Jonathan D Gibson

(74) *Attorney, Agent, or Firm* — Kilpatrick Townsend & Stockton LLP

(57) ABSTRACT

Systems and methods for artificial intelligence (AI)-based troubleshooting for automated software testing are provided. A testing server accesses a runtime log related to a failed test case. The testing server executes a trained artificial intelligence (AI) model to determine a cause for the failed test case by analyzing the runtime log. The trained AI model has been trained to learn one or more characteristics for a successful test case during training. The testing server provides the cause for the failed test case to a client device.

17 Claims, 7 Drawing Sheets

(56) References Cited

U.S. PATENT DOCUMENTS

| | | | | |
|---|---|---|---|---|
| 2025/0165326 | A1* | 5/2025 | Baker | G06F 40/30 |
| 2025/0181490 | A1* | 6/2025 | Dietrich | G06N 3/08 |
| 2025/0190854 | A1* | 6/2025 | Wiebalk | G06N 20/00 |
| 2025/0348406 | A1* | 11/2025 | Kepics | G06F 11/3684 |
| 2026/0044434 | A1* | 2/2026 | Reuveni | G06F 11/3668 |

* cited by examiner

400

ARTIFICIAL INTELLIGENCE-BASED TROUBLESHOOTING FOR AUTOMATED SOFTWARE TESTING

FIELD

The present application generally relates to software testing and more specifically relates to artificial intelligence (AI)-based troubleshooting for automated software testing.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
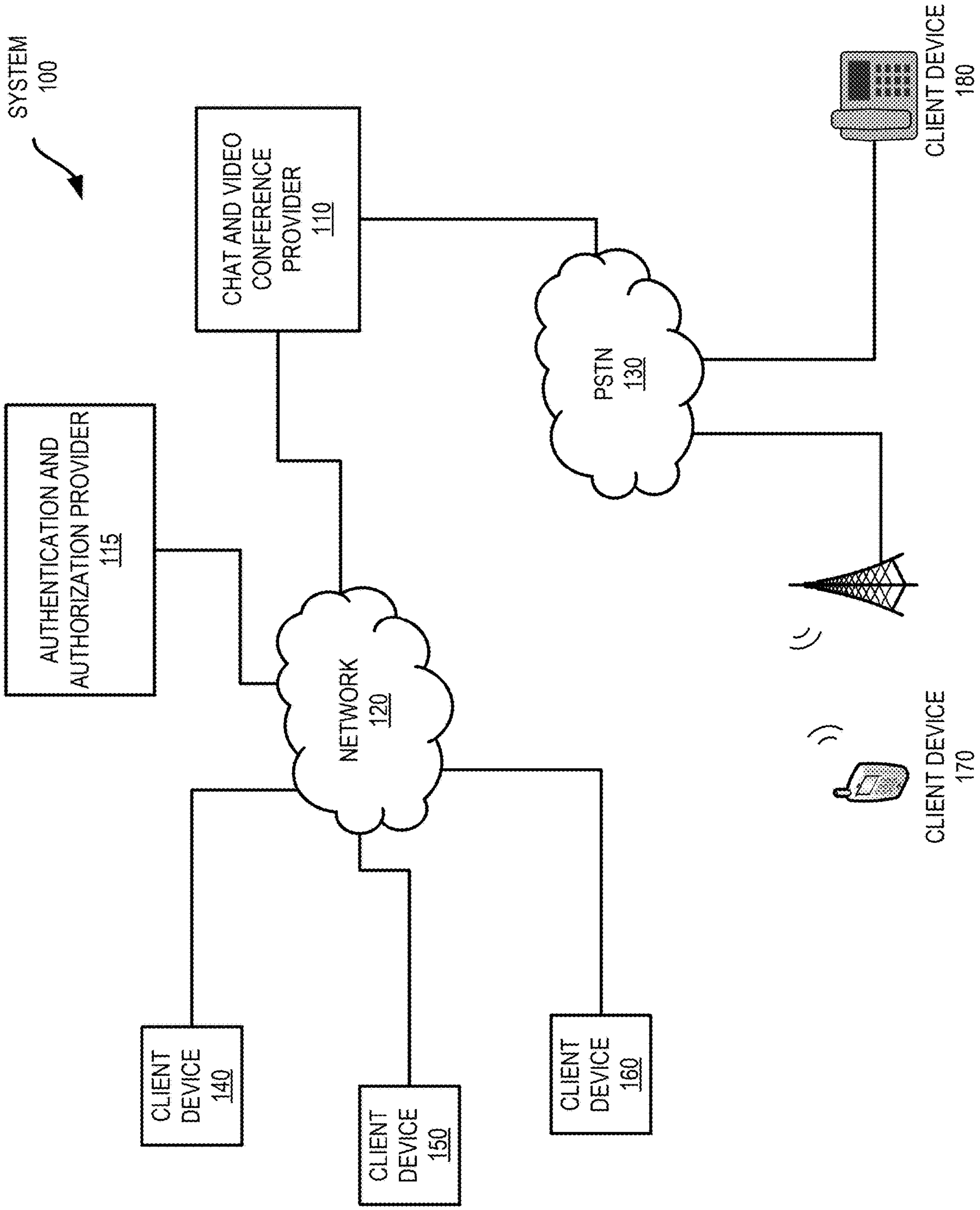
FIG. 1 shows an example system that provides chat and videoconferencing functionalities to various client devices.

Examples are described herein in the context of artificial intelligence (AI)-based troubleshooting for automated software testing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Automated testing is an important process of ensuring software quality. Normally, a standardized automated test process can be divided into three parts: automated test script writing and management; automated test environment setup and use case running; and automated test results feedback and problem solving. Automated testing generates rich information in runtime. The usual practice is simply to get the result of pass/fail and provide to a developer specifically which cases did not pass, and a lot of useful information from the runtime is discarded. To locate a problem, the developer essentially simulates the automated tests again manually. Further iterative debugging is required for problems that cannot be easily identified in the code, in order to develop information for locating the problem. However, such information is already generated during runtime.

In order to avoid extra steps for troubleshooting and efficiently facilitate error analysis for automated testing, it is desirable to provide an artificial intelligence (AI)-based analytics engine to determine the cause of a test failure using rich runtime information.

For example, a communication platform includes an AI-based analytics engine. The AI-based analytics engine uses a large language model (LLM) or other suitable AI models trained to analyze log data and identify causes for test failures. During training, the LLM learns patterns of successful test cases and patterns of failed test cases to determine expected values, value ranges, data types, or other characteristics of certain fields in a log for a type of test case. Training data includes a set of logs and running environment information for a set of successful test cases and a set of logs and runtime information for a set of failed test cases. The logs and running environment information associated with failed test cases help enhance the pattern learning.

The AI-based analytics engine uses the trained LLM to determine the cause of a failed test case. The trained LLM analyzes a log and runtime information for a failed test case and determines a cause of the error by analyzing corresponding log data and running environment information. For a test run including multiple test cases, the trained LLM identifies correlation between failed cases in the test run and generates a summary indicating a root cause for the failures in the test run, rather than simply listing the reasons for individual failed cases.

Meanwhile, the AI-based analytics engine organizes runtime information in an interactive graphical user interface (GUI) diagram. The interactive GUI diagram contains basic information such as time, request parameters, device information, user role, and indication of errors. The cause of the error is usually tagged with corresponding log content. An interactive GUI diagram also allows the user to view the full log and jump quickly to the corresponding code, via a "trace" button. It also allows the user for error analysis, via an "analysis" button.

Thus, by utilizing rich runtime information from test runs, a trained LLM determines the cause of a test case failure and generalizes the cause for multiple test case failures in one test run. It greatly improves efficiency and effectiveness of troubleshooting for automated testing. In addition, the interactive GUI presents the runtime information in an organized manner for a developer to effectively trace and identify key information, including the cause of an error and corresponding log content, to facilitate troubleshooting.

This illustrative example is given to introduce the reader to the general subject matter discussed herein and the disclosure is not limited to this example. The following sections describe various additional non-limiting examples and examples of AI-based troubleshooting for automated software testing.

Referring now to FIG. 1, FIG. 1 shows an example system 100 that provides chat and video functionalities to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
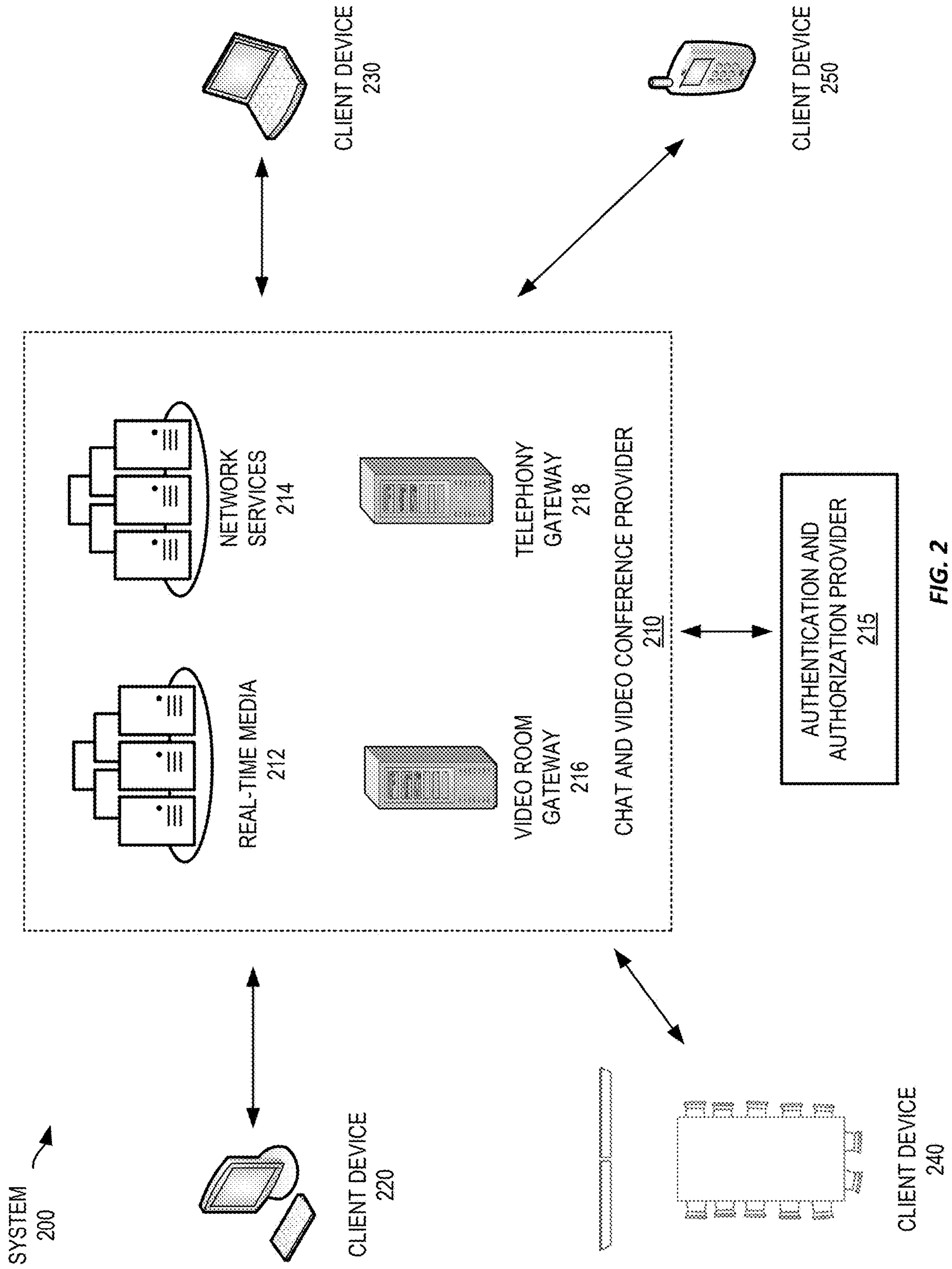
FIG. 2 shows an example system in which a chat and video conference provider provides chat and videoconferencing functionalities to various client devices.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and video conference provider 210 provides chat and videoconferencing functionalities to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting.

Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a Software Testing different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
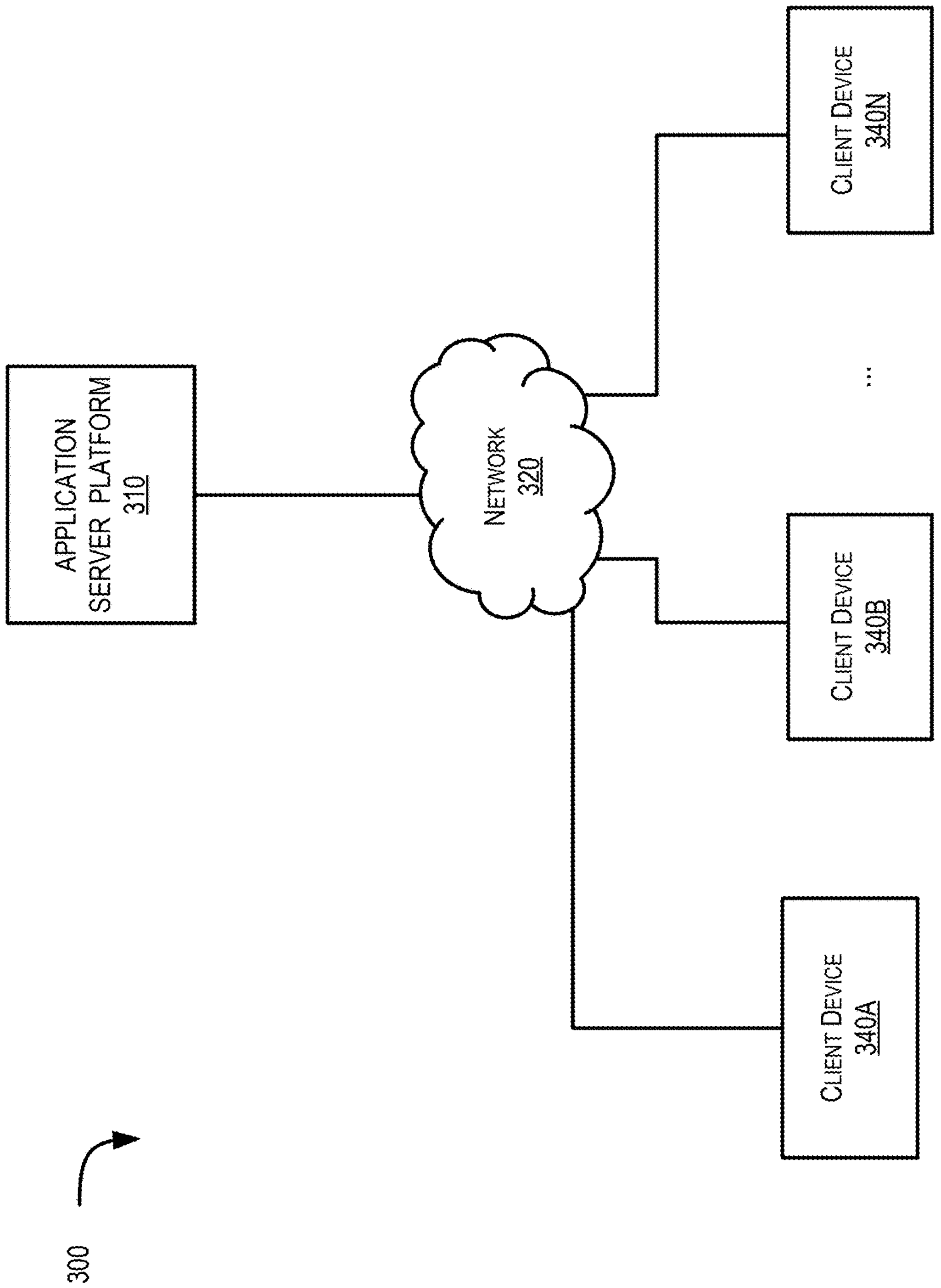
FIG. 3 shows an example system that can establish a virtual communication session.

Referring now to FIG. 3, FIG. 3 shows an example system 300 that can establish a virtual communication session. In this example system 300, an application server platform 310 and a number of client device 340A-340N (which may be referred to herein individually as a client device 340 or collectively as the client devices 340) are connected via a network 320. The application server platform 310 can be the chat and video conference provider 110 in FIG. 1 or the chat and video conference provider 210 in FIG. 2. The network 320 can be the internet or any suitable communications network or combination of communications network may be employed, including LANs (e.g., within a corporate private LAN), WANS, MANs, cellular network (e.g., 3G, 4G, 4G LTE, 5G, etc.), or any combination of these.

The client devices 340 can be any suitable computing or communications device. The client device 340 can be a client device (e.g., 140, 150, 160, or 170) in FIG. 1 or a client device (e.g., 220, 230, or 250) in FIG. 2. For example, client devices 340 may be desktop computers, laptop computers, tablets, smart phones having processors and computer-readable media, connected to the application server platform 310 using the internet or other suitable computer network. The client devices 340 have communication software installed to enable them to connect to the application server platform 310 for chats, video conferences, emails, and any other suitable communications. For example, during a video conference session, a user associated with a client device (e.g., client device 340A) can interact with other users associated with other client devices (e.g., client device 340B-340N) via the application server platform 310 by video and audio streams.

Figure 4:
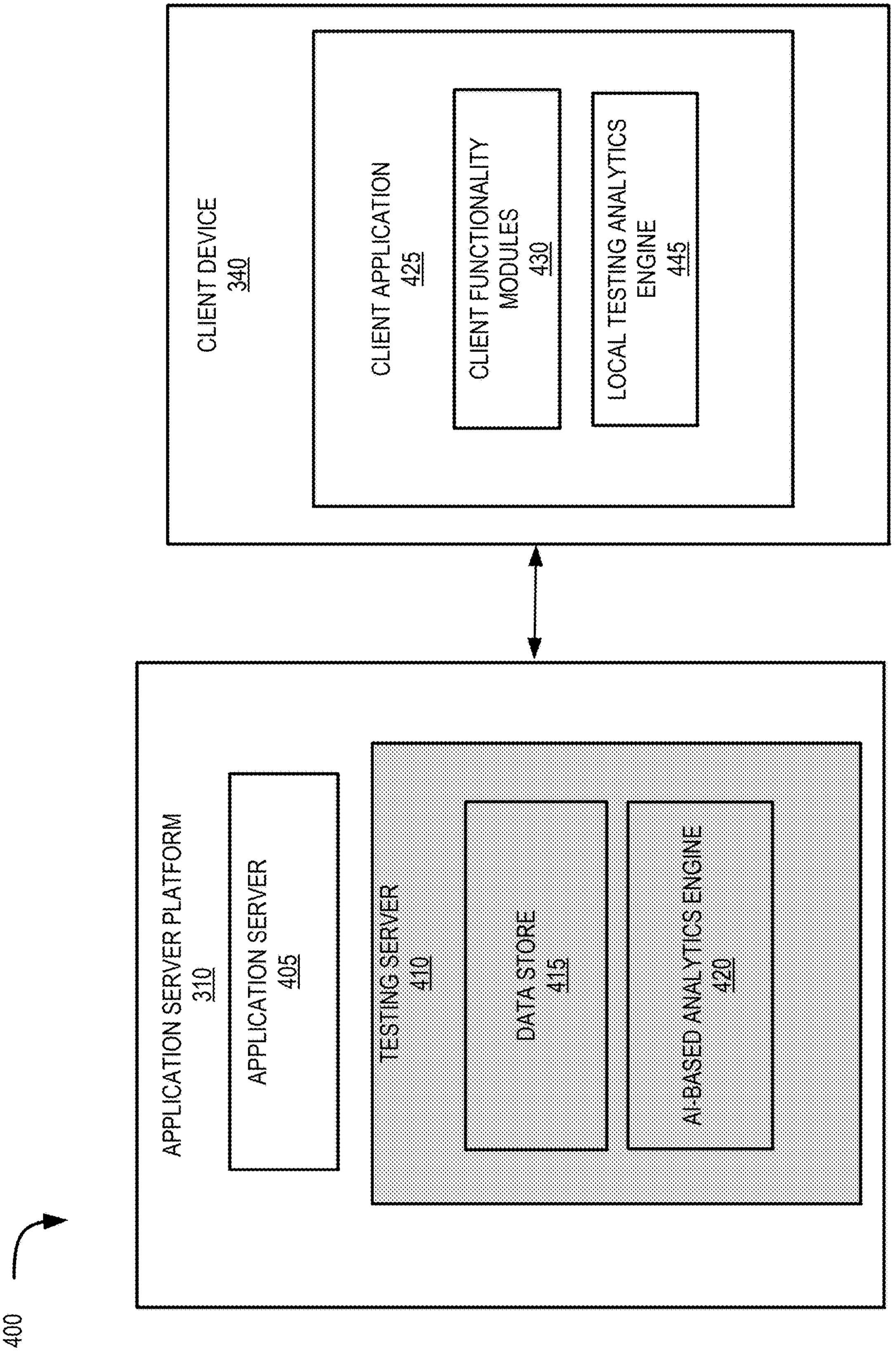
FIG. 4 shows an example system that is configured for AI-based troubleshooting for automated software testing.

Now referring to FIG. 4, FIG. 4 shows an example system 400 that is configured for AI-based troubleshooting for automated software testing. The application server platform 310 is in network communication with a client device 340. The application server platform 310 includes an application server 405 and a testing server 410.

The application server 405 is a product or service provider. The application server 405 provides a client application 435 including certain client functionality modules 430. For example, the application server 405 is the chat and video conference provider 110 in FIG. 1 or the chat and video conference provider 210 in FIG. 2, configured to establish video conferences for a plurality of client devices 340. The client functionality modules 430 include video conferencing, chat, and other communication functionalities enabled by the chat and video conference provider 110 or 210.

The testing server 410 is configured for automated testing and troubleshooting various functionalities of the client application 425 provided by the application server 405. The testing server 410 includes a data store 415 and an AI-based analytics engine 420.

The data store 415 stores testing data associated with automated testing and troubleshooting. For example, test cases scripts, testing logs, runtime information (e.g., testing start time, testing end time, device information, etc.), and troubleshooting results (e.g., root causes), etc. In some examples, the data store 415 also stores training test data that is used to train an AI model used by the AI-based analytics engine 420, as will be described below.

The AI-based analytics engine 420 is configured to analyze the testing logs and runtime information and determine a root cause for a failed testing case, using a trained AI model. Various types of AI/ML models or algorithms may be trained to analyze a testing log of a failed test case to identify a cause for the failure. For example, simple ML models, such as Linear Regression and Gradient Boosting may be used. In other examples, more sophisticated models, such as Factorization Machines ("FM"). As more data is available, deep learning models may be utilized, such as DeepFM and Wide&Deep or other similar models. Other alternative ML models that might be used include a deep convolutional neural network ("CNN"), a residual neural network ("Resnet"), or a recurrent neural network, e.g., long short-term memory ("LSTM") models or gated recurrent units ("GRUs") models. The ML model can also be any other suitable ML model, such as a three-dimensional CNN ("3DCNN"), a dynamic time warping ("DTW") technique, a hidden Markov model ("HMM"), etc., or combinations of one or more of such techniques—e.g., CNN-HMM or MCNN (Multi-Scale Convolutional Neural Network). Further, some examples may employ adversarial networks, such as generative adversarial networks ("GANs"), or may employ autoencoders ("AEs") in conjunction with machine-learning models, such as AEGANs or variational AEGANs ("VAEGANs"). Alternatively, the AI/ML model can be transformer networks, self-attention based neural networks, large language models (LLMs), or other foundational models. In addition, the models or artificial intelligence algorithms can be supervised or unsupervised learning models.

During training, the AI model analyzes a set of training testing logs for a set of successful tests to learn and identify certain patterns of the training testing logs. A specific testing operation in different successful tests may correspond to different values in corresponding training testing logs. In some examples, the AI model learns to generalize or summarize the values at one location to learn corresponding requirements or criteria for successful test cases. For example, a meeting ID may have different values, but may have the same characteristics or conform to particular requirements or criteria, such as being a numeric value. Thus the AI model is trained to expect different numeric values but to identify other values, e.g., alphanumeric values, strings, or other symbols as being invalid for a meeting ID.

The AI model also analyzes a set of training testing logs for a set of failed tests to further identify certain patterns that match or do not match the ones from the successful testing logs. Some patterns from the failed testing logs that do not match those from the successful testing logs may indicate a cause of the failure. For example, the meeting IDs in failed testing logs are string values, not numeric values. In other words, the meeting IDs in failed testing logs do not satisfy the learned requirements (or criteria, or characteristics) for meeting IDs, which indicates that the meeting ID can be a cause of the testing failure. In some examples, the AI model updates certain learned requirements after analyzing testing logs of failed tests. For example, the AI model learns that the meeting IDs in the failed testing logs are all Os. The AI model then updates the requirements for the value of the meeting ID, for example the meeting IDs are not expected to be zeros. That is, if a meeting ID is 0, it may indicate a cause of a testing failure.

A testing log usually contains information such as time, request parameters, device IDs, runtime environment, and other related information. The distribution of these information in a testing log can be erratic. It can be hard to Software Testing locate a specific line for an error log. Also, even if the testing results are all successful, the details of corresponding testing logs can be different.

When a testing log for a failed testing case is provided to the AI-based analytics engine 420, the AI-based analytics engine 420 processes the testing log to identify one or more places in the testing log, which do not match the characteristics or meet the requirements or criteria learned by the AI model during training. The trained AI model determines one or more causes for the corresponding failed testing case based on the log content at the one or more identified places in the testing log. For a test run including multiple test cases, the trained AI model identifies correlation between failed cases in the test run and generate a summary indicating a root cause for the failures in the test run, rather than simply listing the reasons for individual failed cases.

The AI-based analytics engine 420 is also configured to organize rich runtime information from one or more test cases in an interactive GUI diagram. The interactive GUI diagram contains basic information such as time, request parameters, device information, user role, and indication of errors. GUI diagrams with different display styles are designed for different types of tests, for example, a clear sequence diagram for application programming interface (API) test and a hierarchical tree structure diagram for client application test. The interactive GUI diagram also allows the user to view the full testing log in a graphical representation, via a "trace" button. It also allows the user for error analysis, via an "analysis" button, to identify causes of a testing failure, using the trained AI model. The cause of failure is usually tagged with corresponding log data.

The client device 340 is installed with a client application 425 including client functionality modules 430 provided by the application server 405. The testing server 410 can execute automated testing for the client functionality modules 430. The client device 340 also includes a local testing analytics engine 445 for analyzing a testing log of a failed automated test to identity a cause of the failed test, similar to the AI-based analytics engine 420 on the testing server 410 of the application server platform 310. The local testing analytics engine 445 uses or implements an AI model trained on the testing server 410.

The client device 340 also includes a GUI for the client functionality modules 430, for example, hosting or joining a video conference, or creating or joining a chat channel. In addition, the client device 340 also includes a GUI for displaying the interactive GUI diagram with various runtime information for one or more test cases run on the client device 340 or for different test cases run on different client devices 340.

In some examples, a user can evaluate the result of the analysis and provide feedback for improving the training of the AI model used in the AI-based analytics engine 420 and strengthening the AI model's analytics capabilities via reinforcement learning.

Figure 5:
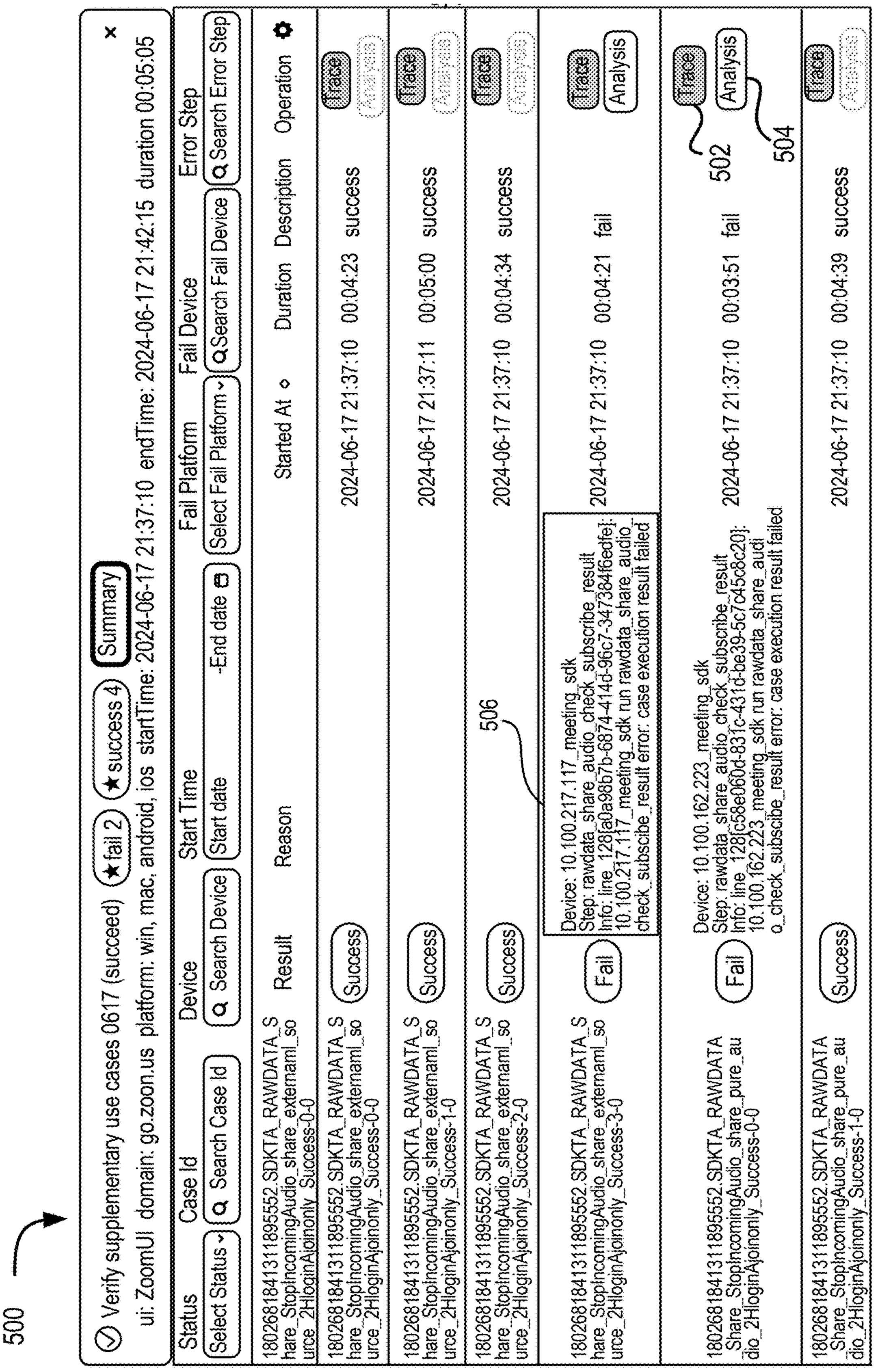
FIG. 5 shows an example GUI displaying a list of multiple test cases.

Referring now to FIG. 5, FIG. 5 shows an example GUI 500 displaying a list of multiple test cases. In FIG. 5, each test case includes a case ID, a test result (e.g., success or fail), reason for failure, start time, duration, description (e.g., success or fail), and available operations. An example operation 502 includes "trace," which enables a user to see the steps of a test case. Another example operation 504 includes "analyze," which triggers the AI-based analytics engine 420 to analyze log data and running environment information of a corresponding failed test case to identify the cause of the failed test. The cause or reason for the failed test can be identified and displayed in the GUI 500, including device information where the failure happened, a failed step, and log data corresponding to the failed step. For example, box 506 includes information related to the reason for a failed case. The device information is 10.100.217.117_meeting-_sdk, indicating the IP address of the device that is installed with a meeting SDK. The failed step is "rawdata_share_audio_check_subscribe_result," indicating when the device checks the subscription result before sharing audio, the test case failed. The corresponding log information in line 128 of the log for the test case indicates the failed execution results.

Figure 6:
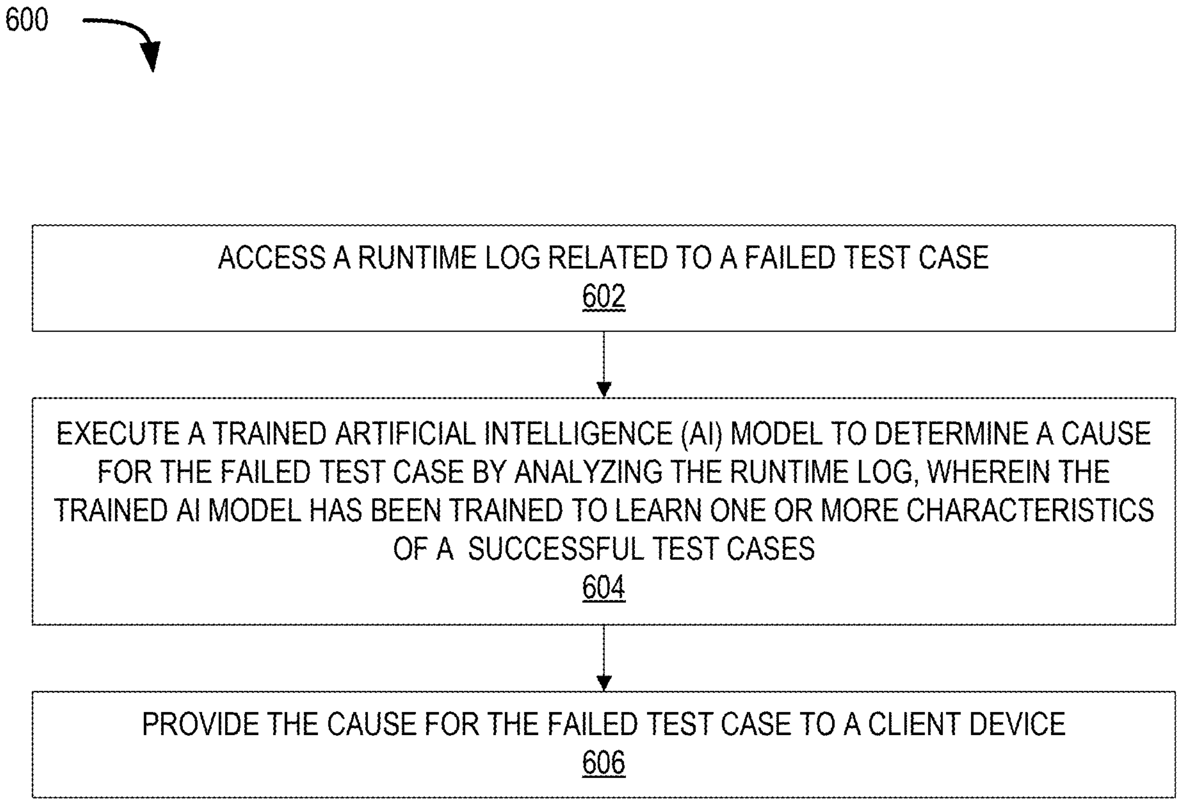
FIG. 6 shows an example method for AI-based troubleshooting for automated software testing.

Referring now to FIG. 6, FIG. 6 shows an example method 600 for AI-based troubleshooting for automated software testing. The example method 600 will be discussed with respect to the system 400 shown in FIG. 4; however, any suitable system for providing AI-based troubleshooting for automated software testing may be used.

At block 602, a testing server 410 accesses a runtime log related to a failed test case. The testing server 410 is on an application server platform 310, including a data store 415 and an AI-based analytics engine 420. The AI-based analytics engine 420 accesses a runtime log related to a failed test case and stored in the data store 415. The runtime log includes information such as steps, timestamps or other timing information, request parameters, device IDs, runtime environment, and other related information.

At block 604, the testing server 410 executes a trained AI model to determine a cause for the failed test case by analyzing the runtime log. The trained AI model has been trained to learn one or more characteristics of a successful test case. During training, the testing server 410 or another module on the application server platform 310 provides a first set of training log data associated with a set of training successful test cases to an AI model, and the AI model is trained using the first set of training log data to identify patterns in the first set of training log data and learn a set of characteristics for different fields in a log for a successful test case. The testing server 410 or another module on the application server platform 310 also provides a second set of training log data associated with a set of training failed test cases. The AI model is further trained using the second set of training log data to identify patterns in the second set of training log data to update the set of characteristics to obtain the one or more characteristics. In some examples, the AI model updates the learned requirements based on the training with the second set of training log data associated with the set of training failed test cases. For example, when analyzing testing logs for training successful tests, the AI model generalizes the meeting ID values for successful tests to be numeric values. Then when analyzing testing logs for training failed tests, the AI model generalizes the meeting ID values of failed tests to be zeros. The AI model then updates the characteristics for the meeting ID for a successful test case to be numerical values but not equal to zero. In some examples, the testing server 410 or another module on the application server platform 310 (e.g., a trainer engine (not shown)) create a set of log labels for the learned requirements or criteria.

The AI-based analytics engine 420 uses the trained AI model to process the runtime log accessed at block 602 to identify one or more causes for a failed test case by analyzing the runtime log. In some examples, the AI-based analytics engine 420 tag or label the runtime log with log labels corresponding to the learned requirements. Log data in the runtime log that does not match or comply with the log labels are identified as a cause of the failed test case. For example, the runtime log includes a meeting ID with a value of 0, which does not meet the characteristic learned for the meeting ID or the corresponding label. It indicates that the meeting ID in the test case causes the test failure.

At block 606, the testing server 410 provides the cause for the failed test case to a client device 340. The cause of the failed test case and other information can be displayed in an interactive GUI. The other information includes the case ID, case result, start time, and duration. Information for the cause of the failed test case includes the failed step and related device and log data corresponding to the failed step. In some examples, a user associated with the client device 340 reviews the information related to the cause and other log data, and provides feedback about the cause. The feedback can be confirming the identified cause or correcting the cause. The user feedback can be used to fine-tune or enhance the trained AI model using a reinforcement algorithm.

The example method 600 illustrates a method for AI-based troubleshooting for automated software testing. However, not every step in the example method 600 may be needed, or some steps may be in a different order. The example method 600 is performed by a testing server 410. Alternatively, the example method 600 can be performed by a local testing analytics engine 445 of a client application 425 installed on a client device 340.

Figure 7:
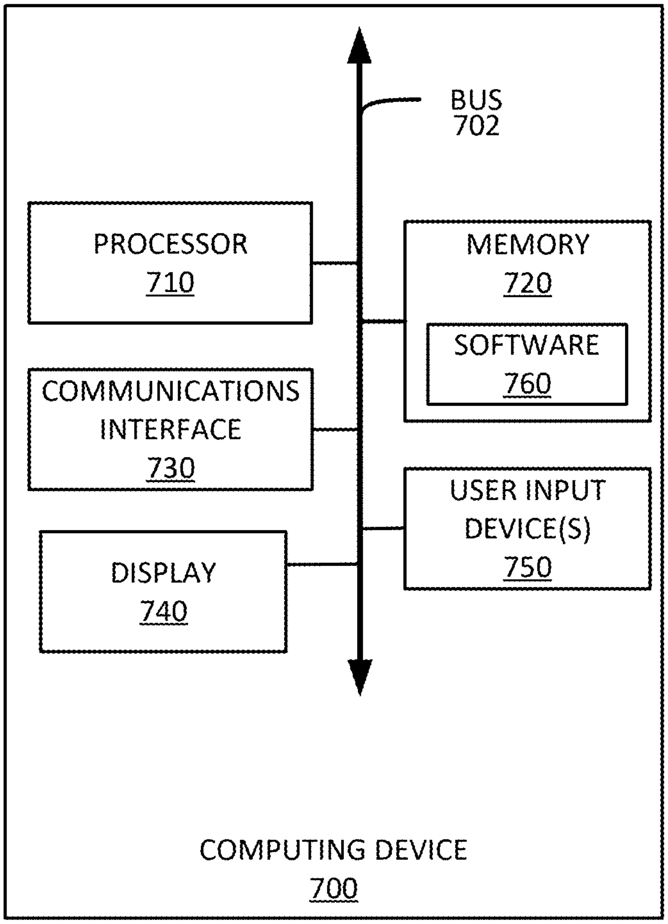
FIG. 7 shows an example computing device suitable for use in example systems or methods for AI-based troubleshooting for automated software testing according to this disclosure.

Referring now to FIG. 7, FIG. 7 shows an example computing device 700 suitable for use in example systems or methods for AI-based troubleshooting for automated software testing according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for AI-based troubleshooting for automated software testing according to different examples, such as part or all of the example method 600 described above with respect to FIG. 6. In some embodiments, the computing device 700 may include software 760 for executing one or more methods described herein, such as for example, one or more steps of method 600. The computing device 700, in this example, also includes one or more user input devices 750, such as a keyboard, mouse, touchscreen, microphone, etc., to accept user input. The computing device 700 also includes a display 740 to provide visual output to a user.

In addition, the computing device 700 includes software 760 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:

accessing a first set of training log data associated with a set of successful test cases;

training an artificial intelligence (AI) model using the first set of training log data to learn a set of characteristics for successful test cases;

accessing a second set of training log data associated with a set of failed test cases; and further training the AI model using the second set of training log data to update set of characteristics for the successful test cases, thereby obtaining a trained AI model learned with an updated set of characteristics for the successful test cases;

accessing a runtime log related to a failed test case;

analyzing the runtime log using the trained AI model to determine a cause for the failed test case comprising generating a plurality of log labels for the runtime log and comparing the plurality of log labels with the updated set of characteristics; and providing the cause for the failed test case to a client device.

2. The method of claim 1, further comprising:

identifying a section of log data at a location in the runtime log not matching a characteristic of the updated set of characteristics for the location; and causing the section of log data to be displayed, wherein the section of log data indicates the cause for the failed test case.

3. The method of claim 1, wherein the updated set of characteristics comprise a requirement associated with a section of log data for the successful test cases.

4. The method of claim 1, wherein the trained AI model comprises a generative pre-trained transformer (GPT) model.

5. The method of claim 1, further comprising:

receiving user feedback about the cause for the failed test case; and fine-tuning the trained AI model with a reinforcement algorithm.

6. The method of claim 1, further comprising presenting the runtime log related to the failed test case in an interactive graphical user interface (GUI).

7. A system comprising:

a communications interface;

a non-transitory computer-readable medium; and one or more processors communicatively coupled to the communications interface and the non-transitory computer-readable medium, the one or more processors configured to execute processor-executable instructions stored in the non-transitory computer-readable medium to:

access a first set of training log data associated with a set of successful test cases;

train an artificial intelligence (AI) model using the first set of training log data to learn a set of characteristics for successful test cases;

access a second set of training log data associated with a set of failed test cases; and further train the AI model using the second set of training log data to update set of characteristics for the successful test cases, thereby obtaining a trained AI model learned with an updated set of characteristics for the successful test cases;

access a runtime log related to a failed test case;

analyze the runtime log using the trained AI model to determine a cause for the failed test case comprising generating a plurality of log labels for the runtime log and comparing the plurality of log labels with the updated set of characteristics;

and provide the cause for the failed test case to a client device.

8. The system of claim 7, wherein the one or more processors are configured to execute further processor-executable instructions stored in the non-transitory computer-readable medium to:

identify a section of log data at a location in the runtime log not meeting a characteristic of the updated set of characteristics for the location; and cause the section of log data to be displayed, wherein the section of log data indicates the cause for the failed test case.

9. The system of claim 7, wherein the updated set of characteristics comprise a requirement associated with a section of log data for the successful test cases.

10. The system of claim 7, wherein the trained AI model comprises a generative pre-trained transformer (GPT) model.

11. The system of claim 7, wherein the one or more processors are configured to execute further processor-executable instructions stored in the non-transitory computer-readable medium to:

receive user feedback about the cause for the failed test case; and fine-tune the trained AI model with a reinforcement algorithm.

12. The system of claim 7, wherein the one or more processors are configured to execute further processor-executable instructions stored in the non-transitory computer-readable medium to:

present the runtime log related to the failed test case in an interactive graphical user interface (GUI).

13. A non-transitory computer-readable medium comprising processor-executable instructions configured to cause one or more processors to:

access a first set of training log data associated with a set of successful test cases;

train an artificial intelligence (AI) model using the first set of training log data to learn a set of characteristics for successful test cases;

access a second set of training log data associated with a set of failed test cases; and further train the AI model using the second set of training log data to update set of characteristics for the successful test cases, thereby obtaining a trained AI model learned with an updated set of characteristics for the successful test cases;

access a runtime log related to a failed test case;

analyze the runtime log using the trained AI model to determine a cause for the failed test case comprising generating a plurality of log labels for the runtime log and comparing the plurality of log labels with the updated set of characteristics;

and provide the cause for the failed test case to a client device.

14. The non-transitory computer-readable medium of claim 5, further comprising processor-executable instructions configured to cause one or more processors to:

identify a section of log data at a location in the runtime log not meeting a characteristic on the updated set of characteristics for the location; and cause the section of log data to be displayed, wherein the section of log data indicates the cause for the failed test case.

15. The non-transitory computer-readable medium of claim 13, wherein the updated set of characteristics comprise a requirement associated with a section of log data for the successful test cases, wherein the trained AI model comprises a generative pre-trained transformer (GPT) model.

16. The non-transitory computer-readable medium of claim 13, further comprising processor-executable instructions configured to cause one or more processors to:

receive user feedback about the cause for the failed test case; and fine-tune the trained AI model with a reinforcement algorithm.

17. The non-transitory computer-readable medium of claim 13, wherein the one or more processors are configured to execute further processor-executable instructions stored in the non-transitory computer-readable medium to:

present the runtime log related to the failed test case in an interactive graphical user interface (GUI).

* * * * *